Figure 6:
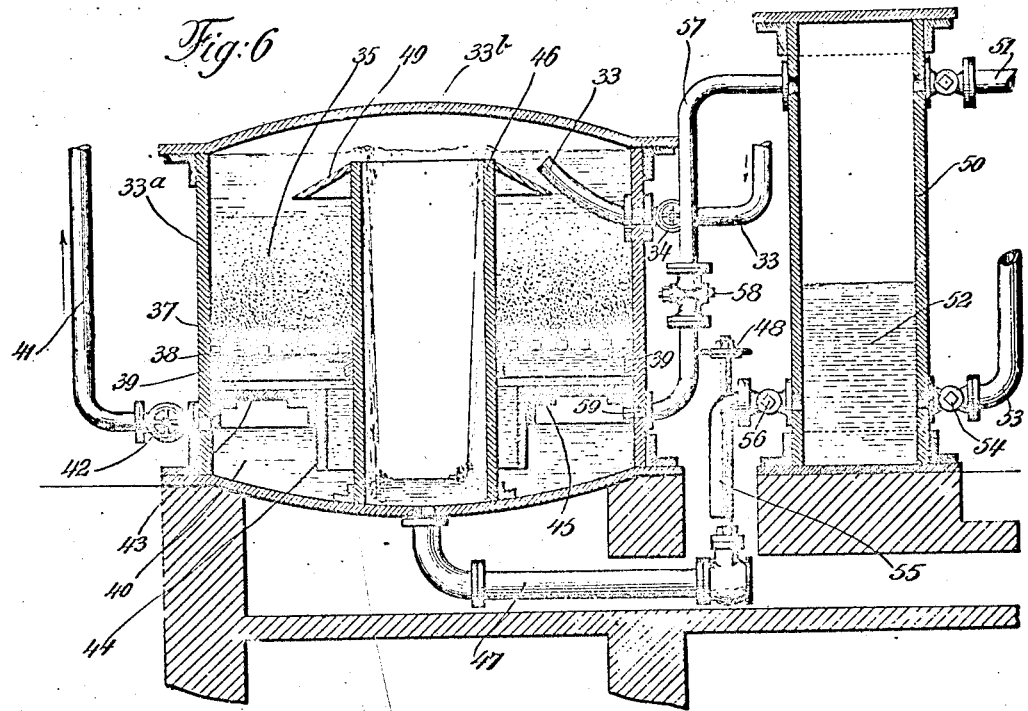

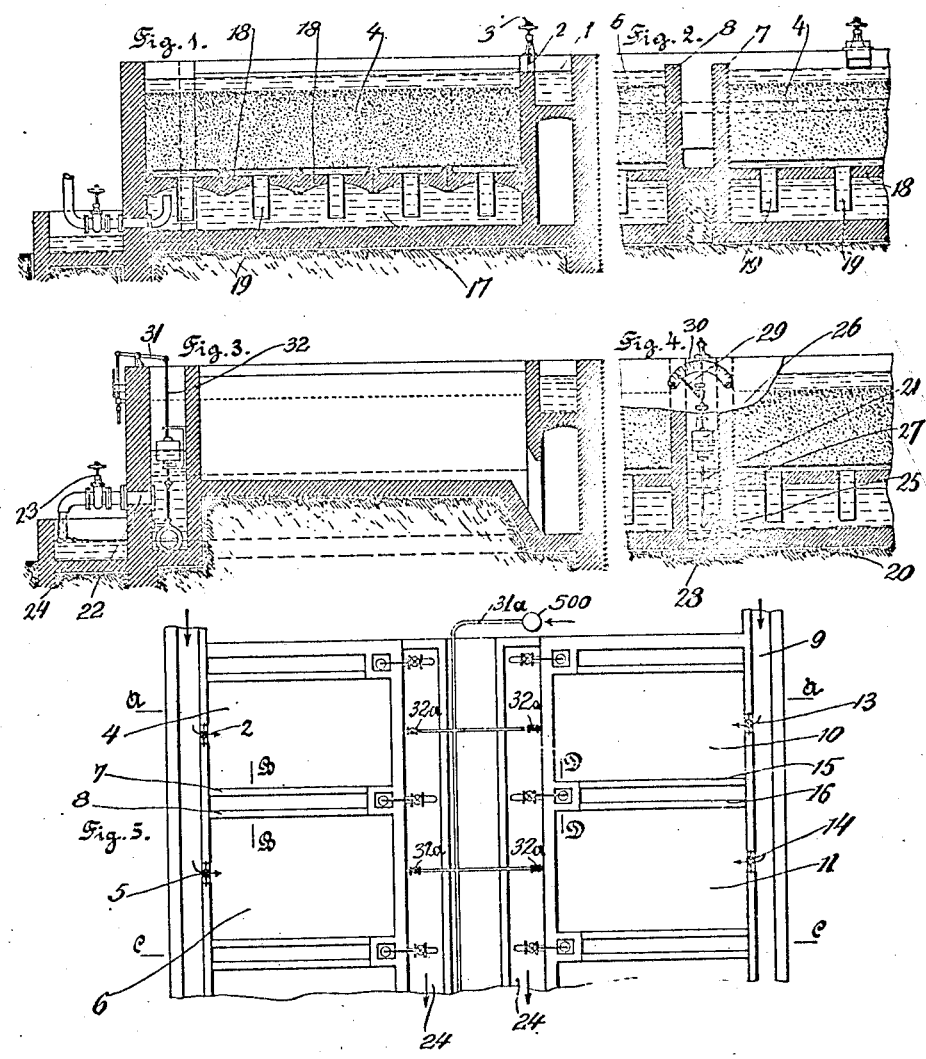

No. 895,198. PATENTED AUG. 4, 1908.
H. REISERT.
APPARATUS FOR PURIFYING WATER.
APPLICATION FILED MAY 12, 1906.

2 SHEETS—SHEET 2.

WITNESSES:
John O. Templer.
D. Harold Parish

INVENTOR
Hans Reisert
BY Wm. F. Bissing
his ATTORNEY

UNITED STATES PATENT OFFICE.

HANS REISERT, OF COLOGNE, GERMANY, ASSIGNOR TO HANS REISERT COMPANY, A CORPORATION OF GERMANY.

APPARATUS FOR PURIFYING WATER.

No. 895,198.  Specification of Letters Patent.  Patented Aug. 4, 1908.

Application filed May 12, 1906. Serial No. 316,428.

*To all whom it may concern:*

Be it known that I, HANS REISERT, a citizen of the Empire of Germany, and a resident of Cologne, Germany, have invented certain new and useful Improvements in Apparatus for Purifying Water, of which the following is a specification.

My invention relates to water purifying apparatus, and in particular to water purifying apparatus comprising one or more filter-beds, with means for regulating the discharge of the water from one or more of the filter-beds, and with means for quickly and effectively washing out the filter-bed or beds.
One object of my invention is to provide a filter-bed with a reservoir suitably located with relation to filter-bed, said reservoir being adapted to receive filtered water during the filtering operation, and to provide means for quickly and effectively forcing the water from the reservoir through the filter-bed, through passages of ample cross-section, to permit the rapid washing out of the filter-bed and the distribution of the wash water over one side of and through the filter-bed, without interrupting, for a long time, the filtering operation.

Another object of my invention is to provide a regulating means for controlling the flow of water through the filter-bed, said regulating means comprising a chamber that receives the filtered water, together with a float in the chamber and a regulating valve suitably located in a discharge passage from the filter-bed, whereby as the back pressure produced by the filter increases, the back pressure through the discharge passage decreases.

With the above and other objects in view, my invention consists in the parts, improvements and combinations more particularly set out in the claims.

Referring now to the drawings which are attached to this specification and form a part hereof: Figure 1 illustrates a sectional view of one form of my invention, the sections being taken on the line A—A of Fig. 5; Fig. 2 illustrates a sectional view on the line B—B of Fig. 5; Fig. 3 is a sectional view on the line C—C of Fig. 5; Fig. 4 is a sectional view on the line D—D of Fig. 5; Fig. 5 is a plan view of part of the filtering apparatus.

Figure 7:
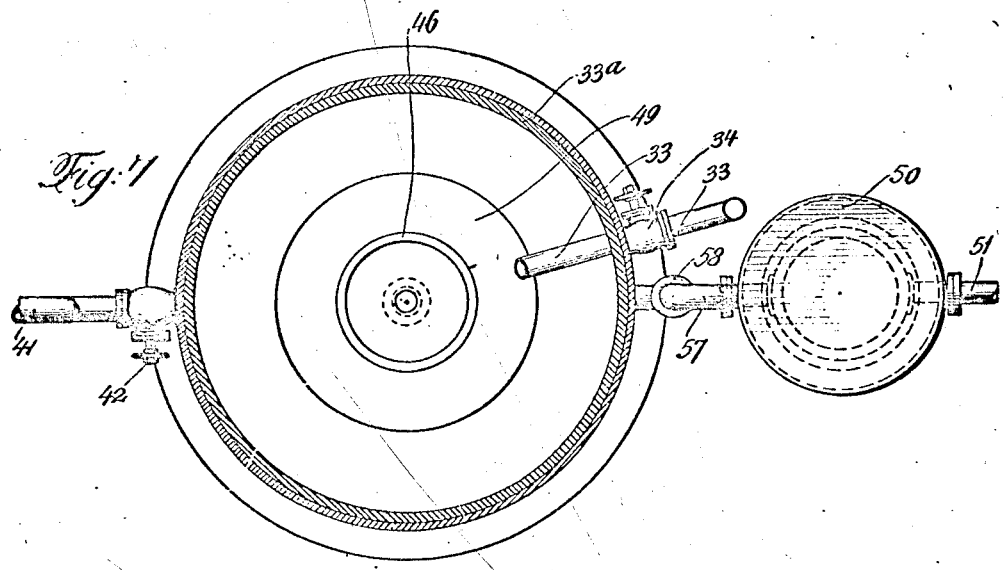

Fig. 6 illustrates another embodiment of my invention, in which a discharge pipe for the waste water is located within the filter-bed; and Fig. 7 illustrates a top plan view of Fig. 6.

In Fig. 1, the raw water to be purified is conveyed to the filters through a channel 1. I have shown a battery of filters supplied from the channel 1, a valve-gate 2 controlled by the adjustable hand-screw 3 being used to permit the water to flow from the channel 1 to the filter-bed 4. A gate 5 allows water to pass from the channel 1 to the filter-bed 6. The filter-beds 4 and 6 are separated from each other by means of the walls 7 and 8. In the same way the channel 9 allows water to enter the filter-beds 10 and 11 through the gates 13 and 14. The filter-beds 10 and 11 are separated by the walls 15 and 16. The water, after passing through the filter-bed, descends to the reservoir 17 located beneath the filter-bed. This reservoir is separated from the filter-bed by means of a partition 18. As shown in Fig. 1, the partition is made up of a plurality of blocks suitably connected together; one or more tubes 19 pass through the partition and form the means of permitting the water to pass from the filter-bed to the reservoir or in the reverse direction during the wash-out operation, as may be desired. The water leaves each filter-bed through a discharge passage 20, and passes into a chamber 21, and then through an outlet 22, controlled by a stop-cock 23, into a sluice 24.

I have provided suitable means for regulating the flow of water through the filter-bed, to compensate for the varying back pressure offered by the filter-bed, as the filter clogs. In the best embodiment of my invention I make use of a valve 25, pivoted in the passage 20, so that the movement of the valve will more or less open the passage. I locate in the chamber 21 a float 26, which takes its position on the water level in the chamber and rises and falls as the water level rises and falls. Suitable means, such as a connecting-rod 27 and a bell-crank 28, are provided for connecting the float to the valve. I also make use of a pointer 29 and scale 30, connected to the float by the lever 31 and rod 32, to indicate the position of the float. As the filter becomes clogged, the water level in the chamber 21 sinks, the float descends, the valve 25 opens, and the pointer moves away from its zero position. The resistance offered to the discharge of the water thereby decreases as the resistance or back pressure due to the filter increases.

When the pointer reaches the extreme end of the scale, this indicates that it is time to wash out the filter. This I accomplish by the following means: The reservoir 17 contains enough water to wash out the filter quickly and effectively in substantially one operation. The tubes 19 have sufficient and ample cross-section to permit the quick and effective flow of water in the reverse direction through the filter-bed. Suitable means are provided to force the wash water through the tubes 19 which means, in the form illustrated in the drawings, are independent of the pipe 31ª which supplies raw water to the filter bed. I prefer for this purpose to make use of a pipe 31ª, controlled by a valve 32ª, which supplies compressed air from the air compressor 500 to the reservoir 17. As soon as the valve 32ª is opened, the compressed air rushing into the reservoir 17 at or near the top and below the partition 18, will force the water in the reservoir 17 up through the tubes 19 and out over the top of the filter.

In the form of my invention shown in Figs. 6 and 7, I make use of a closed filter-bed operating under pressure, as distinguished from the open filter-bed shown in Figs. 1 and 5. The filter chamber 33ª has a cover 33ᵇ under which air is compressed. Raw water is supplied to the filter-bed by means of the pipe 33, controlled by valve 34. The filter-bed 35 consisting of sand or other suitable material rests upon the foundation 37 of coarse stones, the bed being supported by the perforated wall 38. Brackets 39 carry the wall. The water passes through the filter-bed, and the filtered water enters the reservoir 40, passing therefrom by the pipe or discharge passage 41, controlled by the valve 42. The partition wall 43 separates the reservoir from the filter-bed. A large tube 44 passes through the partition and is secured thereto by the brackets 45.

In order to wash out the filter-bed in the best embodiment of this form of my invention, I make use of a large discharge tube 46, which receives the discharged wash-out water and carries it away by the pipe 47, controlled by a valve regulated by the hand-wheel 48. Flanges 49 guide the water to the tube 46. A reservoir 50 is located near the filter-bed and supplied with air through the pipe 51. This air is compressed in the reservoir by means of a hydraulic column 52, which is supplied to the reservoir by the pipe 53, controlled by the valve 54. The water may be discharged from the reservoir 50, when it is desired to compress a fresh lot of air, by the pipe 55, controlled by valve 56. After the air is compressed in the reservoir 50, it may be admitted to the top of the reservoir 40 and below the partition 43 by a pipe 57, controlled by valve 58, which enters the reservoir 40 at the point 59. The valve 58 is closed during the operation of compressing the air in the reservoir 50.

It will be observed that the pipe 57 and the reservoir 50 constitute a means for supplying compressed air to the reservoir 40, which are independent of the means for supplying water to the filter bed, or, in other words, that the means for supplying air and the water to be purified to the apparatus are independent of each other.

When it is desired to wash out the filter, the valve 42 is closed, the valve 48 opened, as well as the valve 58. The air rushes through the pipe 57, presses upon the top of the water in the reservoir 40, the wash water being forced through the passage 44 upwardly through the filter-bed, having been evenly distributed thereunder, and is discharged through the tube 46 and the pipe 47. The quantity of water stored in the reservoir 40 is usually sufficient to wash out the filter-bed in one operation.

Having thus described my invention, it will be evident that many modifications of the apparatus by means of which my invention is carried into effect, may be made without departing from the principles thereof.

What I claim and desire to secure by Letters-Patent is—

1. In a water purifying apparatus, the combination of a filter, a discharge passage for the filtered water, a reservoir arranged between said filter and said passage and adapted to be supplied with purified water during the filtering operation by the flow of water in one direction through the filter, means connecting said reservoir and filter, said means being of ample cross-section to permit the rapid supply of water from the reservoir to the filter in the reverse direction during the wash out operation, and means for rapidly forcing the water contained in said reservoir through said filter bed.

2. In a water purifying apparatus, the combination of a filter-bed, a discharge passage for the filtered water, a reservoir beneath said filter-bed and arranged between said filter bed and said passage, said reservoir being of a sufficient capacity to contain the amount of water requisite to wash out said filter-bed, said reservoir being arranged and adapted to be supplied with purified water during the filtering operation by the flow of water in one direction through the filter-bed, means connecting said reservoir and filter-bed, said means being of ample cross-section to permit the rapid supply of water from the reservoir to the filter-bed in the reverse direction during the wash out operation, and means for rapidly forcing the water contained in said reservoir through said filter bed.

3. In a water purifying apparatus, the combination of a filter-bed, a discharge passage for filtered water, a reservoir arranged between said discharge passage and said filter bed beneath said filter-bed, said reservoir being of a sufficient capacity to contain the amount of water requisite to wash out said filter-bed, and said reservoir being adapted to be supplied with purified water during the filtering operation by the flow of water in one direction through the filter-bed, one or more short tubes between said reservoir and said filter-bed, said tube or tubes having ample cross-section so as to permit the rapid supply of water from the reservoir to the filter-bed in the reverse direction.

4. In a water purifying apparatus, the combination of a filter-bed, a reservoir beneath said filter-bed, said reservoir being of a sufficient capacity to contain the amount of water requisite to wash out said filter-bed, and said reservoir being adapted to be supplied with purified water during the filtering operation by the flow of water in one direction through the filter-bed, a partition between said filter-bed and said reservoir, one or more tubes passing through said partition, said tube or tubes having ample cross-section so as to permit the rapid supply of water from the reservoir to the filter-bed in the reverse direction.

5. In a water purifying apparatus, the combination of a filter-bed, means for supplying water to and delivering it from said filter-bed, a reservoir for purified water beneath said filter-bed, said reservoir being of sufficient capacity to contain enough water to wash out said filter-bed, means connecting said reservoir and filter-bed, said means being of ample cross-section to permit the rapid supply of water from the reservoir to the filter-bed, and means for supplying pneumatic pressure to said reservoir, so as to force the wash water through the filter-bed.

6. In a water purifying apparatus, the combination of a filter-bed, a discharge passage for the filtered water, means for supplying water to be filtered in one direction to said filter-bed, a reservoir beneath said filter-bed arranged between said discharge passage and said filter bed, said reservoir being adapted to contain the water to wash out said filter-bed, and being arranged and adapted to be supplied with purified water by the filtering operation, means leading from said reservoir to said filter-bed to carry wash water in a reverse direction through said filter-bed, said means including a passage-way of large cross-section located between said reservoir and said filter-bed, and means for forcing the charge of wash water from said reservoir through said filter-bed and through said passage, said means being independent of the means for supplying the water to be filtered to the filter-bed.

7. In a water purifying apparatus, the combination of a filter-bed, a discharge passage for said filter bed, a reservoir beneath said filter-bed arranged between said discharge passage and said filter bed, said reservoir being of a sufficient capacity to contain enough water to wash out said filter-bed, means leading from said reservoir to said filter-bed to carry wash water in a reverse direction through said filter-bed, said means including a passageway of large cross-section located between said reservoir and said filter-bed, and means for supplying pneumatic pressure to said reservoir to force said wash water from said reservoir through said filter-bed and through said passage.

8. In a water purifying apparatus, the combination of a filter-bed, a reservoir beneath said filter-bed, said reservoir being of a sufficient capacity to contain enough water to wash out said filter-bed, means leading from said reservoir to said filter-bed to carry wash water in a reverse direction through said filter-bed, said means including a passageway of large cross-section located between said reservoir and said filter-bed, means for supplying compressed air, a pipe between said means and said reservoir, and a valve in said pipe.

9. In a water purifying apparatus, the combination of a filter-bed, a passage for discharging filtered water from said filter-bed, a valve in said passage, a chamber for receiving the discharged water, a float on the water line in said chamber adapted to rise and fall in said chamber as the water level in said chamber varies, the parts being so proportioned and adjusted that as the resistance to the flow of water through the filter increases, the resistance offered by the valve to the discharge of water from the filter-bed decreases.

10. In a water purifying apparatus, the combination of a filter-bed, a passage for discharging filtered water from said filter-bed, a valve in said passage, a chamber for receiving the discharged water, an outlet from said chamber, a float on the water line in said chamber adapted to rise and fall in said chamber as the water level in said chamber varies, connections between said float and said valve, and a pointer and scale connected to said float.

11. In a water purifying apparatus, the combination of a plurality of filter-beds, a passage for each of said filter-beds for discharging filtered water, a valve in each passage, a chamber for each filter-bed for receiving the discharged water, an outlet from each chamber, a float on the water line in each chamber adapted to rise and fall in said chamber as the water level in said chamber varies, and connections between each float and the corresponding valve, the parts being so proportioned and adjusted that as the resistance to the flow of water through any filter-bed increases, the resistance offered by the valve to the discharge of water from the filter-bed decreases.

12. In a water purifying apparatus the combination of a filter bed, a discharge passage for said filter bed, a reservoir beneath said filter bed arranged between said discharge passages and said filter bed, said reservoir being of sufficient capacity to contain the amount of water requisite to wash out said filter bed and said reservoir being arranged to be supplied with purified water during the filtering operation by the flow of water in one direction through the filter bed, means connecting said reservoir and filter bed, said means being of ample cross-section to permit the rapid supply of water from the reservoir to the filter bed in the reversed direction during the wash out operation and means for discharging the wash water from the filter bed, said last means being of ample cross-section to permit the rapid discharge of wash water from the filter bed.

13. In a water purifying apparatus, the combination of a filter bed, a discharge passage for the filtered water, a reservoir adapted to contain a storage supply of wash water and arranged between said discharge passage and said filter bed, passages of ample cross-section between the reservoir and the filter bed to permit the rapid supply of water from the reservoir to the filter bed during the wash out operation, means for distributing the wash water through one side of the filter bed and means for discharging the wash water from the filter bed, said last named means being of ample cross-section to permit the rapid discharge of water from the filter bed.

14. In a water purifying apparatus, the combination of a horizontal filter-bed, a discharge passage for the filtered water, a reservoir adapted to contain a storage supply of wash water arranged between said discharge passage and said filter-bed, a partition consisting of a plurality of blocks between said reservoir and said filter-bed, a plurality of tubes passing through said partition of ample cross-section so as to permit the rapid supply of water from the reservoir to the filter bed during the wash-out operation, a pipe for compressed air, the mouth of which is arranged adjacent to said partition, and means for discharging wash-water from the filter-bed, the said last named means being of ample cross-section to permit the discharge of water from the filter-bed.

In testimony whereof, I have signed my name to this specification, in the presence of two subscribing witnesses.

HANS REISERT.

Witnesses:
  LOUIS VANDORY,
  EUGEN KREUTZBERG.